US011979628B1

(12) United States Patent
Neill et al.

(10) Patent No.: US 11,979,628 B1
(45) Date of Patent: *May 7, 2024

(54) DIGITAL VIDEO RECORDING WITH REMOTE STORAGE

(71) Applicant: CSC Holdings, LLC, Bethpage, NY (US)

(72) Inventors: Richard W. Neill, Syosset, NY (US); Stephanie Mitchko, Smithtown, NY (US); Peter Caramanica, Westbury, CT (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,072

(22) Filed: Jul. 12, 2021

Related U.S. Application Data

(63) Continuation of application No. 16/239,783, filed on Jan. 4, 2019, now Pat. No. 11,064,239, which is a
(Continued)

(51) Int. Cl.
*H04N 21/2747* (2011.01)
*H04N 21/231* (2011.01)
(Continued)

(52) U.S. Cl.
CPC ... *H04N 21/2747* (2013.01); *H04N 21/23109* (2013.01); *H04N 21/23113* (2013.01);
(Continued)

(58) Field of Classification Search
CPC ......... H04N 21/2747; H04N 21/25816; H04N 21/23109; H04N 21/23113;
(Continued)

(56) References Cited

U.S. PATENT DOCUMENTS 5,440,334 A * 8/1995 Walters .............. H04N 7/17318
348/E7.071
5,550,577 A 8/1996 Verbiest et al.
(Continued)

FOREIGN PATENT DOCUMENTS

| AU | 2008275579 A1 | 1/2009 |
|---|---|---|
| CN | 105871872 A | 8/2016 |

(Continued)

OTHER PUBLICATIONS

Scripps / Amazon Agreement Article downloaded from http://www.redorbit.com/modules/news/tools.php?tool=print&id=776909, dated Feb. 7, 2007 (2 pages).

(Continued)

*Primary Examiner* — Pinkal R Chokshi
(74) *Attorney, Agent, or Firm* — Sterne, Kessler, Goldstein & Fox P.L.L.C.

(57) ABSTRACT

Centralized storage and playback of user-recorded television programming eliminates the need for expensive DVR devices to be deployed in the field. Further, the methods used to initiate storage and provide playback of stored media respect copyright principles.

20 Claims, 6 Drawing Sheets

Related U.S. Application Data continuation of application No. 15/807,328, filed on Nov. 8, 2017, now Pat. No. 10,178,425, which is a continuation of application No. 14/550,566, filed on Nov. 21, 2014, now Pat. No. 9,819,984, which is a continuation of application No. 12/055,795, filed on Mar. 26, 2008, now abandoned.

(60) Provisional application No. 60/920,059, filed on Mar. 26, 2007.

(51) Int. Cl.
| | | |
|---|---|---|
| *H04N 21/234* | (2011.01) | |
| *H04N 21/258* | (2011.01) | |
| *H04N 21/61* | (2011.01) | |
| *H04N 21/6587* | (2011.01) | |

(52) U.S. Cl.
CPC . *H04N 21/23406* (2013.01); *H04N 21/25816* (2013.01); *H04N 21/25875* (2013.01); *H04N 21/6118* (2013.01); *H04N 21/6587* (2013.01)

(58) Field of Classification Search
CPC ....... H04N 21/23406; H04N 21/25875; H04N 21/6118; H04N 21/6587
See application file for complete search history.

(56) References Cited

U.S. PATENT DOCUMENTS

| | | |
|---|---|---|
| 5,568,181 A | 10/1996 | Greenwood et al. |
| 5,720,037 A | 2/1998 | Biliris et al. |
| 5,721,829 A | 2/1998 | Dunn et al. |
| 6,002,720 A | 12/1999 | Yurt et al. |
| 6,151,444 A | 11/2000 | Abecassis |
| 6,182,128 B1 | 1/2001 | Kelkar et al. |
| 6,233,389 B1 | 5/2001 | Barton et al. |
| 6,636,953 B2 * | 10/2003 | Yuasa .................... H04H 60/27 707/999.204 |
| 6,801,947 B1 * | 10/2004 | Li ...................... H04N 7/17327 725/87 |
| 6,963,590 B1 | 11/2005 | Mann |
| 6,985,932 B1 | 1/2006 | Glaser et al. |
| 7,000,242 B1 | 2/2006 | Haber |
| 7,080,400 B1 | 7/2006 | Navar |
| 7,325,245 B1 | 1/2008 | Clapper |
| 7,469,284 B1 | 12/2008 | Dubrovsky et al. |
| 7,624,412 B2 | 11/2009 | McEvilly et al. |
| 7,802,275 B1 | 9/2010 | Fernandez et al. |
| 8,132,221 B2 | 3/2012 | Malik |
| 8,732,776 B2 | 5/2014 | Youssefmir |
| 8,782,285 B1 | 7/2014 | Cassidy et al. |
| 8,997,136 B2 | 3/2015 | Brooks et al. |
| 9,077,667 B2 | 7/2015 | Sridhar |
| 9,369,723 B2 | 6/2016 | Syed |
| 9,473,548 B1 | 10/2016 | Chakrovorthy et al. |
| 9,571,782 B2 | 2/2017 | Rutledge |
| 9,819,984 B1 | 11/2017 | Neill et al. |
| 9,888,267 B2 * | 2/2018 | Compton ........... H04N 7/17309 |
| 9,955,203 B2 | 4/2018 | Phillips et al. |
| 10,158,913 B1 | 12/2018 | Rutledge |
| 10,178,425 B1 | 1/2019 | Neill et al. |
| 10,638,184 B2 | 4/2020 | Phillips et al. |
| 10,904,329 B1 | 1/2021 | Wartski et al. |
| 10,986,390 B2 | 4/2021 | Phillips et al. |
| 11,064,239 B1 | 7/2021 | Neill et al. |
| 11,122,330 B1 | 9/2021 | Rutledge |
| 11,175,434 B2 | 11/2021 | Laverne |
| 11,284,165 B1 | 3/2022 | Kenny et al. |
| 2001/0043616 A1 | 11/2001 | Hild et al. |
| 2002/0026645 A1 | 2/2002 | Son et al. |
| 2002/0069405 A1 | 6/2002 | Chapin et al. |
| 2002/0076195 A1 | 6/2002 | Nakajima et al. |
| 2002/0094025 A1 | 7/2002 | Hanamura et al. |
| 2002/0138844 A1 | 9/2002 | Otenasek et al. |
| 2002/0174147 A1 | 11/2002 | Wang et al. |
| 2003/0044170 A1 | 3/2003 | Haddad et al. |
| 2003/0070182 A1 | 4/2003 | Pierre et al. |
| 2003/0097659 A1 | 5/2003 | Goldman |
| 2003/0113027 A1 | 6/2003 | Chan et al. |
| 2003/0149988 A1 * | 8/2003 | Ellis .................. H04N 21/2335 725/62 |
| 2003/0169813 A1 | 9/2003 | Van Der Schaar |
| 2003/0177247 A1 | 9/2003 | Dunning et al. |
| 2003/0208765 A1 | 11/2003 | Urdang et al. |
| 2003/0208767 A1 | 11/2003 | Williamson et al. |
| 2003/0233663 A1 | 12/2003 | Rao et al. |
| 2004/0006698 A1 * | 1/2004 | Apfelbaum ............ G11B 19/00 |
| 2004/0057449 A1 | 3/2004 | Black |
| 2004/0098463 A1 | 5/2004 | Shen et al. |
| 2004/0133923 A1 | 7/2004 | Watson et al. |
| 2004/0187164 A1 | 9/2004 | Kandasamy et al. |
| 2004/0193648 A1 | 9/2004 | Lai et al. |
| 2004/0194146 A1 | 9/2004 | Bates et al. |
| 2004/0203353 A1 | 10/2004 | Connor |
| 2004/0226034 A1 | 11/2004 | Kaczowka et al. |
| 2004/0250282 A1 | 12/2004 | Bankers et al. |
| 2004/0255336 A1 | 12/2004 | Logan et al. |
| 2004/0268386 A1 | 12/2004 | Logan et al. |
| 2005/0033850 A1 | 2/2005 | Kirkland |
| 2005/0034171 A1 | 2/2005 | Benya |
| 2005/0251827 A1 | 11/2005 | Ellis et al. |
| 2005/0267813 A1 | 12/2005 | Monday |
| 2006/0015580 A1 | 1/2006 | Gabriel et al. |
| 2006/0020993 A1 | 1/2006 | Hannum et al. |
| 2006/0080703 A1 * | 4/2006 | Compton ........... H04N 7/17309 348/E7.07 |
| 2006/0130116 A1 | 6/2006 | Shi et al. |
| 2006/0140584 A1 | 6/2006 | Ellis et al. |
| 2006/0218604 A1 | 9/2006 | Riedl et al. |
| 2006/0265384 A1 | 11/2006 | Lee et al. |
| 2007/0044132 A1 | 2/2007 | Kubo et al. |
| 2007/0094702 A1 | 4/2007 | Khare et al. |
| 2007/0124250 A1 | 5/2007 | Yamashima et al. |
| 2007/0130601 A1 | 6/2007 | Li et al. |
| 2007/0154190 A1 | 7/2007 | Gilley et al. |
| 2007/0162941 A1 | 7/2007 | Bennett et al. |
| 2007/0180135 A1 | 8/2007 | Kenrick et al. |
| 2007/0226169 A1 | 9/2007 | Solyanik et al. |
| 2007/0239787 A1 | 10/2007 | Cunningham et al. |
| 2007/0245384 A1 | 10/2007 | Walter et al. |
| 2007/0263514 A1 | 11/2007 | Iwata et al. |
| 2007/0263980 A1 | 11/2007 | Chen et al. |
| 2007/0268164 A1 | 11/2007 | Lai et al. |
| 2007/0276925 A1 | 11/2007 | LaJoie et al. |
| 2007/0294170 A1 | 12/2007 | Vantalon et al. |
| 2008/0001791 A1 | 1/2008 | Wanigasekara-Mohotti et al. |
| 2008/0005770 A1 | 1/2008 | Acharya et al. |
| 2008/0027953 A1 | 1/2008 | Morita et al. |
| 2008/0031590 A1 | 2/2008 | Kulas |
| 2008/0046929 A1 | 2/2008 | Cho et al. |
| 2008/0059645 A1 | 3/2008 | Gregotski et al. |
| 2008/0091535 A1 | 4/2008 | Heiser et al. |
| 2008/0134239 A1 | 6/2008 | Knowles et al. |
| 2008/0134278 A1 | 6/2008 | Al-Karmi |
| 2008/0140818 A1 | 6/2008 | Du Breuil et al. |
| 2008/0209066 A1 | 8/2008 | Spio et al. |
| 2008/0216119 A1 | 9/2008 | Pfeffer et al. |
| 2008/0216135 A1 | 9/2008 | Pfeffer et al. |
| 2008/0216136 A1 | 9/2008 | Pfeffer et al. |
| 2009/0006643 A1 | 1/2009 | Lee |
| 2009/0019492 A1 | 1/2009 | Grasset |
| 2009/0028182 A1 | 1/2009 | Brooks et al. |
| 2009/0029681 A1 | 1/2009 | Clemow et al. |
| 2009/0119322 A1 | 5/2009 | Mills et al. |
| 2009/0138507 A1 | 5/2009 | Burckart et al. |
| 2009/0154556 A1 | 6/2009 | Kim et al. |
| 2010/0034257 A1 | 2/2010 | Sedeffow |
| 2010/0036963 A1 | 2/2010 | Gahm et al. |
| 2010/0115567 A1 | 5/2010 | Gupta et al. |
| 2010/0115568 A1 | 5/2010 | Gupta et al. |
| 2010/0115575 A1 | 5/2010 | Yu et al. |
| 2010/0174804 A1 | 7/2010 | Sonoyama |

(56) References Cited

U.S. PATENT DOCUMENTS

| | | |
|---|---|---|
| 2011/0022801 A1 | 1/2011 | Flynn |
| 2011/0035600 A1 | 2/2011 | Busser et al. |
| 2011/0106910 A1 | 5/2011 | Grasset |
| 2011/0209185 A1 | 8/2011 | Cho et al. |
| 2011/0255555 A1 | 10/2011 | Alexander |
| 2011/0320559 A1 | 12/2011 | Foti |
| 2012/0023251 A1 | 1/2012 | Pyle et al. |
| 2012/0036048 A1 | 2/2012 | Robb et al. |
| 2012/0054664 A1 | 3/2012 | Dougall et al. |
| 2012/0084811 A1 | 4/2012 | Thompson et al. |
| 2012/0084812 A1 | 4/2012 | Thompson et al. |
| 2012/0144408 A1 | 6/2012 | Kim et al. |
| 2012/0144424 A1 | 6/2012 | Ganesan et al. |
| 2012/0185530 A1 | 7/2012 | Reza |
| 2012/0210382 A1 | 8/2012 | Walker et al. |
| 2012/0254536 A1 | 10/2012 | Wilke |
| 2012/0266198 A1 | 10/2012 | Kanojia et al. |
| 2013/0044260 A1 | 2/2013 | Vestergaard et al. |
| 2013/0151493 A1 | 6/2013 | Roth et al. |
| 2013/0262559 A1 | 10/2013 | Neerings et al. |
| 2014/0025837 A1 | 1/2014 | Swenson et al. |
| 2014/0040956 A1 | 2/2014 | Cho et al. |
| 2014/0059134 A1 | 2/2014 | Chiu et al. |
| 2014/0068789 A1 | 3/2014 | Watts et al. |
| 2014/0082124 A1 | 3/2014 | van Coppenolle et al. |
| 2014/0108585 A1 | 4/2014 | Barton et al. |
| 2014/0115090 A1 | 4/2014 | Hasek |
| 2014/0181864 A1 | 6/2014 | Marshall et al. |
| 2014/0269401 A1 | 9/2014 | Gondi et al. |
| 2014/0269920 A1 | 9/2014 | Rodriguez et al. |
| 2014/0282787 A1 | 9/2014 | Wirick et al. |
| 2014/0328569 A1 | 11/2014 | Strobl et al. |
| 2014/0337901 A1 | 11/2014 | Phillips et al. |
| 2014/0337903 A1 | 11/2014 | Zhu et al. |
| 2014/0337909 A1 | 11/2014 | Phillips et al. |
| 2014/0359140 A1 | 12/2014 | Shankarraman |
| 2014/0359166 A1 | 12/2014 | Mamidwar et al. |
| 2015/0007237 A1 | 1/2015 | Good |
| 2015/0046526 A1 | 2/2015 | Bush et al. |
| 2015/0113058 A1 | 4/2015 | Zhang et al. |
| 2015/0135214 A1 | 5/2015 | Reisman |
| 2015/0189018 A1 | 7/2015 | Cassidy et al. |
| 2015/0227294 A1 | 8/2015 | Talvensaari et al. |
| 2015/0242500 A1 | 8/2015 | Walker et al. |
| 2015/0243078 A1 | 8/2015 | Watson et al. |
| 2015/0244973 A1 | 8/2015 | Mullen et al. |
| 2015/0249859 A1 | 9/2015 | Hartley et al. |
| 2015/0269950 A1 | 9/2015 | Schug et al. |
| 2015/0281710 A1 | 10/2015 | Sievert et al. |
| 2015/0324379 A1 | 11/2015 | Danovitz et al. |
| 2015/0339303 A1 | 11/2015 | Perlegos |
| 2015/0341687 A1 | 11/2015 | Luthra et al. |
| 2015/0350726 A1 | 12/2015 | Tan |
| 2015/0363422 A1 | 12/2015 | Shibayama et al. |
| 2016/0014411 A1 | 1/2016 | Sychev |
| 2016/0088084 A1 | 3/2016 | Suman |
| 2016/0164938 A1 | 6/2016 | Yu |
| 2016/0179826 A1 | 6/2016 | Batra |
| 2016/0191961 A1 | 6/2016 | Fisher et al. |
| 2016/0210165 A1 | 7/2016 | Ma |
| 2016/0224310 A1 | 8/2016 | Wallner et al. |
| 2016/0239437 A1 | 8/2016 | Le et al. |
| 2016/0261912 A1 | 9/2016 | Gratton |
| 2016/0309211 A1 | 10/2016 | Grasset |
| 2016/0316234 A1 | 10/2016 | Casey et al. |
| 2016/0323348 A1 | 11/2016 | Bradbury et al. |
| 2016/0323351 A1 | 11/2016 | Luthra et al. |
| 2016/0337477 A1 | 11/2016 | Bush et al. |
| 2016/0344789 A1 | 11/2016 | Watts et al. |
| 2016/0360243 A1 | 12/2016 | Arbuckle et al. |
| 2016/0371286 A1 | 12/2016 | Danovitz et al. |
| 2017/0006314 A1 | 1/2017 | Danovitz et al. |
| 2017/0034112 A1 | 2/2017 | Perlegos |
| 2017/0064311 A1 | 3/2017 | Ma |
| 2017/0064344 A1 | 3/2017 | Peterson et al. |
| 2017/0111670 A1 | 4/2017 | Ducloux et al. |
| 2017/0264968 A1 | 9/2017 | Mao et al. |
| 2017/0339206 A1 | 11/2017 | Holden et al. |
| 2017/0344335 A1 | 11/2017 | Lection et al. |
| 2017/0353768 A1 | 12/2017 | Muvavarirwa |
| 2018/0124445 A1 | 5/2018 | Beili et al. |
| 2018/0167626 A1 | 6/2018 | Andersson et al. |

FOREIGN PATENT DOCUMENTS

| | | |
|---|---|---|
| EP | 0 757 487 B1 | 6/2000 |
| EP | 2 151 970 A1 | 2/2010 |
| EP | 2 977 915 A1 | 1/2016 |
| FR | 3036210 A1 | 11/2016 |

OTHER PUBLICATIONS

AT&T Homezone Article downloaded from http://www.backchannelmedia.com/newsletter/articles/4881/ATampT-Moving-into-Cable-T . . . dated Feb. 7, 2007 (3 pages).

Adelphia Extends Partnership with Gotuit Media to Enhance On Demand Programming with Personalized Viewing downloaded from http://www.atlasventure.com/newsandevents/news.cfm?id=308&p=1 dated Feb. 7, 2007 (2 pages).

Incentra Solutions, Inc. "Front Porch Digital Signs Global Reseller Agreement with Volicon" downloaded from http://www.incentrasolutions.com/print.php./sid/37/aid/159/pid/211nid/447/siteype/Incentra . . . dated Feb. 7, 2007 (3 pages).

Vividon and EMC Agree to Integrate 'Best in Class' On-demand Streaming and Centera Content Addressed Storage (2 pages).

Mostefaoui, "A modular and adaptive framework for large scale video indexing and content-based retrieval: the SIRALE system" (20 pages).

Mercer, "Keeping up with content, How to successfully manage VOD's bread-and-butter" (pp. 51-54).

Wang et al. "Optimal Proxy Cache Allocation for Efficient Streaming Media Distribution" from IEEE INFOCOM 2002 (pp. 1726-1735).

Czyrnek et al., "Large-scale multimedia content delivery over optical networks for interactive TV services" from Future Generation Computer Systems 22 (2006) pp. 1018-1024.

Non-final Office Action, dated Aug. 29, 2012, for U.S. Appl. No. 13/029,687, filed Feb. 17, 2011, 8 pages.

Final Office Action, dated Feb. 14, 2013, for U.S. Appl. No. 13/029,687, filed Feb. 17, 2011, 11 pages.

Non-final Office Action, dated Aug. 14, 2013, for U.S. Appl. No. 13/029,687, filed Feb. 17, 2011, 11 pages.

Final Office Action, dated Mar. 11, 2014, for U.S. Appl. No. 13/029,687, filed Feb. 17, 2011, 11 pages.

Non-final Office Action, dated Jun. 5, 2014, for U.S. Appl. No. 13/029,687, filed Feb. 17, 2011, 11 pages.

Final Office Action, dated Feb. 11, 2015, for U.S. Appl. No. 13/029,687, filed Feb. 17, 2011, 13 pages.

Non-final Office Action, dated Jun. 29, 2015, for U.S. Appl. No. 13/029,687, filed Feb. 17, 2011, 13 pages.

Final Office Action, dated Nov. 30, 2015, for U.S. Appl. No. 13/029,687, filed Feb. 17, 2011, 13 pages.

Non-final Office Action, dated Apr. 19, 2016, for U.S. Appl. No. 13/029,687, filed Feb. 17, 2011, 13 pages.

U.S. Appl. No. 12/055,795, filed Mar. 26, 2008.

Non-final Office Action, dated Sep. 29, 2017, for U.S. Appl. No. 15/390,036, filed Dec. 23, 2016, 6 pages.

Final Office Action, dated Feb. 20, 2018, for U.S. Appl. No. 15/390,036, filed Dec. 23, 2016, 7 pages.

U.S. Appl. No. 16/173,233, filed Oct. 29, 2018.

\* cited by examiner

DIGITAL VIDEO RECORDING WITH REMOTE STORAGE

CROSS-REFERENCE TO RELATED APPLICATIONS

This application is a continuation of U.S. patent application Ser. No. 16/239,783, filed Jan. 4, 2019, now U.S. Pat. No. 11,064,239, which is a continuation of U.S. patent application Ser. No. 15/807,328, filed Nov. 8, 2017, now U.S. Pat. No. 10,178,425, which is a continuation of U.S. patent application Ser. No. 14/550,566, filed Nov. 21, 2014, now U.S. Pat. No. 9,819,984, which is a continuation of U.S. patent application Ser. No. 12/055,795, filed on Mar. 26, 2008, now abandoned, which claims priority to U.S. Provisional Patent Application No. 60/920,059, filed on Mar. 26, 2007, each of which is incorporated herein by reference in its entirety.

FIELD OF THE INVENTION

The invention relates generally to facilitating the storage and telecast of media content. More specifically, the invention relates to systems and methods for allowing consumers to direct the storage and playback of the content using a remote server.

BACKGROUND

For decades, television viewers have been able to record programming for later viewing using videotape and, more recently, digital video recording (DVR) technology. This practice of "time-shifting" has long been recognized as permissible even for content subject to copyright.

For the convenience of cable television subscribers, DVR technology has recently become available on set-top boxes (STBs) using recordable mass-storage media (e.g., a hard drive) deployed within the STB. This approach, while consistent with the traditional "client-side" arrangement in which the storage device is co-located with the user's television set, is nonetheless cumbersome and expensive as it requires the distribution of the storage equipment to the subscriber base. While co-location may have been unavoidable in the days before secure, high-bandwidth telecommunications, today—particularly in digital-television environments—timely retrieval no longer requires proximity to the storage device. Accordingly, the location of the stored content is arbitrary.

Challenges facing the cable operators (commonly referred to as Multi-System Operators, or "MSOs") are not purely technical, however. Content owners have reluctantly acknowledged court rulings that established the principle that copies of telecast content made by a consumer for his own viewing is "fair use" of such content. Content owners have, however, attempted to limit the applicability of such rulings, suggesting that copies made and stored using equipment located outside the consumer's home (e.g., on the premises of an MSO) are in fact "made by" the MSO and therefore do not fall within the scope of such holdings. If accurate, the MSO would require additional licenses of the content, which would in turn significantly increase the costs of proving such a service.

A need therefore exists to facilitate content storage at a location that is optimal from a system-wide perspective, while permitting users to record television programming and to play back such recordings in a manner substantially similar to and with functionality commonly associated with conventional client-side recording devices, while operating within the legal constraints of copyright law.

SUMMARY OF THE INVENTION

The present invention facilitates the centralized storage and playback of user-recorded television programming, thus eliminating the need for expensive DVR devices to be deployed in the field. Further, the methods used to initiate storage and provide playback of stored telecasts are designed and implemented to respect copyright principles.

In preferred embodiments, the invention provides users with access to a front-end application (for example, via a display device, such as a television, associated with a standard cable STB, and/or via the World Wide Web) that enables a user to command the recording multimedia content such as television programming in real time (e.g., by pressing a "record" button on a remote control or display), either while such content is being telecast or by scheduling a recording in advance. This recorded content is stored in storage space dedicated to the user on servers at a central facility of the MSO, which may also house much of the software and hardware necessary to operate a cable television distribution system.

In deference to copyright principles, the system may be configured to dedicate server-side storage attributed to particular user without creating copies under the direction of the MSO, resulting in a unique copy of the content under the exclusive control of the user. Such an approach avoids the creation and storage of a copy of the content at the direction or initiative of the MSO. To further foster consistency with copyright principles, the system may be configured to avoid rolling buffers and/or redundant or back-up copies of programs recorded by users. Consequently, if the system malfunctions or if the disk drive on which a user's dedicated storage space is located is damaged, the user loses the affected content.

Therefore, in a first aspect, the invention pertains to a method of storing telecast video content on behalf of multiple users (e.g., cable system subscribers). In various embodiments, the method comprises receiving user-initiated commands to store a copy of the telecast video content, associating a nonvolatile storage with each user such that each storage is under the associated user's exclusive control, and receiving the content from a content provider. The content is stored in a primary buffer, which in turn provides the content to secondary buffers that are created in response to (and correspond to) the user-initiated commands. The content is then transferred from each secondary buffer to the storage associated with the user.

The content may be copied from the primary buffer to the secondary buffers at the packet level, thus allowing any limitations as to the amount of data stored at either buffer to be implemented at the packet level. For example, the primary buffer may be limited to storing no more than a fixed percentage (e.g., 0.05%) or time duration (e.g., 0.1 second) of the video content, limiting the number of packets stored accordingly. In some instances, the buffers may store no packets at all, acting as conduits through which the video content is transmitted. The packets may be permanently deleted from the primary buffer as they are provided to the secondary buffer.

In some embodiments, a copy of application code may be instantiated for (and in some cases licensed to) each user such that upon execution, the application receives commands from that individual user and creates unique commands to store the video content on behalf of such user. In some versions, the unique commands are aggregated into a single command whose execution creates the secondary buffers. The individual copies may be stored in the same storage dedicated to each user, or, in other embodiments, on different storage devices and/or different storage locations.

In another aspect, the invention provides a method for of presenting telecast video content to a user. In various embodiments, the method includes receiving a user-initiated command to store a copy of telecast video content and associating nonvolatile storage with the user such that the partition is under the user's exclusive control. The content is received from a content provider and placed in a primary buffer. A secondary buffer corresponding to the command to store the content is created for receiving data from the primary buffer, and as the content is received it is transferred from the primary buffer to the secondary buffer, and subsequently from the secondary buffer to the storage associated with the user having issued the command. Upon receipt of a command from the user to view the stored content, it is transmitted directly from the storage partition to a display device associated with the user.

The stored content may be transmitted from the storage partition without the creation of a playback buffer. In other embodiments, however, the user may initiate commands to alter playback of the content (e.g., fast forwarding, rewinding or pausing, referred to herein as "trick-play"). In such cases, a trick-play buffer may be used to facilitate the altered playback, and in certain instances the trick-play buffer (or its contents) is deleted once the command is executed.

In another aspect, the invention provides a system for storing telecast video content on behalf of multiple users of the system. The system includes an application module having instructions for rendering a user interface facilitating selection of commands for storing the telecast video content, and nonvolatile storage areas each uniquely associated with (and under the exclusive control of) one of the users. The system also includes a transaction server for responding to received commands for storing telecast video content. The transaction server creates unique commands to store the video content on behalf of each of the users and aggregates the unique commands into a single transaction command. The system further includes a content processing server configured to receive the telecast video content from content providers into a first buffer, and in response to the single transaction command creates secondary buffers from the received telecast. Each secondary buffer is uniquely associated with one of the users, and its contents are transmitted onto a corresponding storage partition.

In some versions, copies of the application module may be made for each of the users, thereby allowing each user to interact with and instruct the system using his own copy of the application.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts or steps throughout the different views. Also, the drawings are not necessarily to scale, emphasis instead generally being placed upon illustrating the principles of the invention.

DETAILED DESCRIPTION

Figure 1:
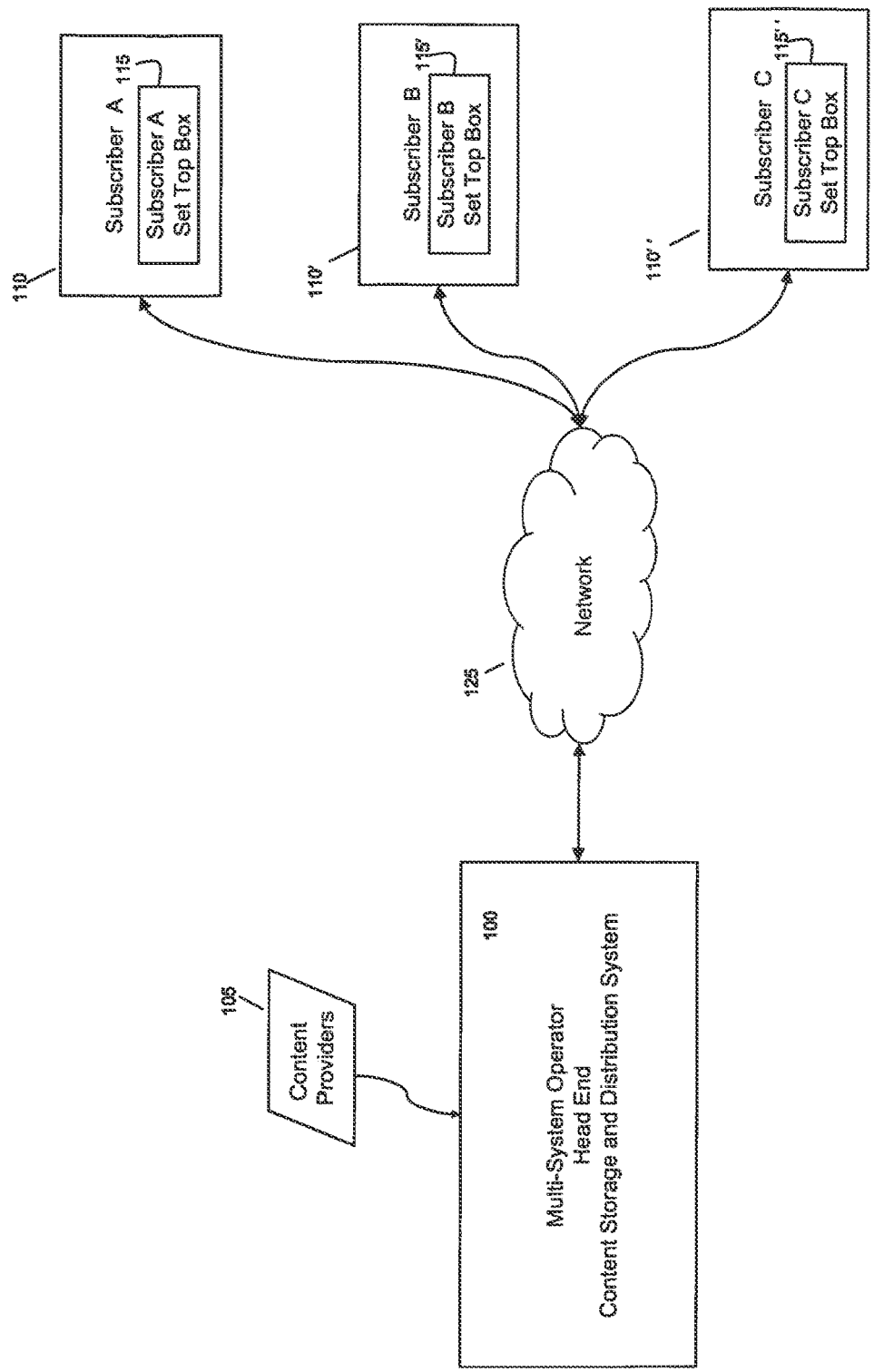
FIG. 1 is a block diagram of an exemplary cable network for delivering media content to and storing media content on behalf of subscribers according to an embodiment of the invention.

FIG. 1 illustrates the general operational environment in which a media content storage and distribution system 100 (the "system") may be implemented in accordance with various embodiments of the invention. Although the system 100 may be owned, operated, leased, or licensed to or from any media entity (e.g., a broadcast or telecast or private network, an Internet service provider, website operator, etc.) for ease of presentation the system 100 will herein be assumed to be owned and operated by a cable television service provider or similar multiple system operator ("MSO"). In such cases, the system 100 is typically located at the "head-end" of the cable network. In large implementations, there may be more than one head-end, each servicing different geographic regions, for example.

Content providers 105 provide media content to the MSO, typically via satellite and in digital form, for subsequent distribution by the MSO. Multiple end-users ("users" or "subscribers") subscribe to the services (channels, broadband Internet access, telephone services, etc.) provided by the MSO, including access to the system 100. As shown, the system 100 services three subscribers 110, 110' and 110", for exemplary purposes, but of course there can be any number of subscribers 110. In some implementations, the system 100 may be provided as part of a standard set of services offered by the MSO, whereas in other cases access and use of the system 100 may be limited to certain subscribers 110, such as those paying additional subscription fees.

To access the system 100, subscribers are issued a set-top-box (STB) 115 (or, in some embodiments a cable card (or similar device) that may be inserted into a television or other display device), typically located at the subscriber's home or business. The STB is used to access the cable network, decode and display the multimedia content of the cable TV channels, and in some cases interact with applications and other services (e.g., video-on-demand, shopping) provided by the MSO. A display unit such as a television or computer (not shown) is coupled to the STB 115, and facilitates the viewing of video programs and multimedia content provided by the MSO. The STB 115 may include an interface that enables the use of a remote control (e.g., an infra-red or radio-frequency transmitter), thereby allowing subscribers 110 to direct the functionality of the STB 115 and cause the transmission of commands from the set-top-box 115 to the head-end.

In other implementations, the STB 115 may be replaced or augmented with a client computer, a television set, or software stored on a cable card, which allows subscribers to view and record digital cable television channels on digital video recorders, personal computers and televisions without the use of a STB. The cable card is similar to a PCMCIA card used to connect laptops to networks. The functionality of the STB may be implemented as software running on a personal computer (e.g., a PC with an INTEL processor or an APPLE MACINTOSH) capable of running such operating systems as the MICROSOFT WINDOWS family of operating systems from Microsoft Corporation of Redmond, Washington, the OSX operating system from Apple Computer of Cupertino, California, and various varieties of Unix, such as SUN SOLARIS from SUN MICROSYSTEMS, and GNU/Linux from RED HAT, INC. of Durham, North Carolina (and others). The STB functionality may also be implemented on such hardware as a smart or dumb terminal, network computer, wireless device, personal data assistant, MP3 player, wireless telephone, information appliance, workstation, minicomputer, mainframe computer, or other computing device, that is operated as a general purpose computer, or a special purpose hardware device used solely for providing subscribers with access to the system 100.

In various embodiments, the STB 115 communicates with the system 110 over a network 125. The network 125 uses coaxial cable, fiber optics, and/or standard or enhanced telephone lines to transmit content and user commands between and among the head-end and the STBs 115. In some instances, in which the STB functionality is provided within or as part of a personal computer, the network 125 man carry TCP/IP protocol communications and HTTP/HTTPS requests made by the set-top-box 115. Other non-limiting examples of networks that can serve as or be part of the communications network 125 include a wireless or wired Ethernet-based intranet, a local or wide-area network (LAN or WAN), and/or the global communications network known as the Internet, which may accommodate many different communications media and protocols.

Generally, the invention facilitates the centralized storage and playback of user-recorded television programming, thus eliminating the need for expensive DVR devices (e.g., enhanced STBs) to be deployed in the field. Subscribers 110 access a front-end application (described in greater detail below and provided, for example, via a display device, such as a television, associated with a standard cable STB, and/or via the web) that enables the subscriber to communicate instructions to equipment located at the MSO to record television programming on his behalf, either while such content is being telecast (i.e., in "real time") or by scheduling a recording in advance. The application provides a menu system which, when displayed on a display device via the STB allows the subscriber 110 to navigate telecast schedules and indicate which programs to record. This recorded content is stored in storage space specifically dedicated to and under the exclusive control the user on servers at the head-end. Using the menu and application, users can select previously recorded programs to watch at any time, and when desired, delete previously recorded content. In some embodiments, the MSO specifically does not create any backup copies of the content, and therefore once a program has been deleted, it is no longer available for playback by the user. Various settings (or metadata) relating to user-selected content, such as duration to retain a particular piece of content, what content to automatically record, etc., can be manipulated by the user.

Depending on the implementation, the system may allow the user to select arbitrary portions of television content for recording (i.e., to start and end recording in response to entered commands), in the manner of a conventional DVR device; in other words, a user can choose to record only a portion of a television program. Unlike conventional methods in which a staging copy is used to create the partial copy, a unique copy of just that portion of the content is created for that user directly from the telecast content in response to the user's commands to do so.

For copyright purposes, the system 100 may be configured to dedicate server-side storage for the exclusive use of a particular user. In such embodiments, each authorized STB (or individual) within a household is assigned a specified amount of dedicated storage space on a server located at the head-end of the cable system. This storage space is preferably all located on the same physical hard drive, which may be shared by multiple (e.g., up to four) users. Through the use of identifiers, each recorded copy of a television program is uniquely associated with the STB through which the record command was sent, and can be retrieved only by that same STB, preventing one user's copies from being accessed by another user. Thus, if 1000 users elect to record a given program, 1000 separate copies of the program are created from the initial streamed telecast of the program, each of which is uniquely associated with the STB through which the corresponding user commanded the program's recording and will be accessible only to that user through his or her STB. If a user's storage space is full, then he will not be able to record any new content unless he deletes a stored program. In some cases, however, a user may mark certain programs to be deleted in the event of such a capacity shortfall or establish rules to address such a shortfall (e.g., a FIFO arrangement whereby the oldest recorded program is deleted as new content is added). Certain embodiments may have default rules (e.g., FIFO) addressing capacity shortfalls unless a user specifically chooses to override them.

To further foster consistency with copyright principles, the system 100, may make a copy of a program only if a user specifically commands it. In such implementations, "rolling buffers" (typically used for temporary recording of a program) are not used, and therefore to record an entire program, a user must initiate a command to do so before the program begins. If, for example, a user presses the "record" button after a program begins, only that portion of the program telecast after the user issued the command will be recorded because the MSO does not make or maintain a complete copy of the program. In some version of the system 100, a user is unable to watch a recorded program until after the recording is complete (i.e., after the telecast of program has been completed). The system 100 may be configured to preclude recording of more than two program streams simultaneously, to minimize (or even eliminate) buffering of the streamed content, and to place restrictions on the amount of storage provided to each STB.

Alternative embodiments may modify or dispense with these restrictions, of course, so long as care is taken with respect to copyright compliance. For example, because the user's tuners are "virtual," there is no technological limitation on the number of simultaneous program streams that can be recorded by a user. Similarly, a single stored copy of a given program item may be streamed to different users upon their individual requests (instead of storing a separate copy for each user), or back-up or redundancy copies may be made to protect against the risk of loss in the event of system error. Alternative embodiments may use larger buffers for transmission convenience, and/or employ a rolling buffer so that the user can direct recording of content from a point earlier than when she actually sends the command to record. A rolling buffer also facilitates pausing of live TV.

In preferred embodiments, programming or viewing preferences that the user has already established with the head-end server (e.g., parental controls, audio options, global preferences, etc.) are applied to recording and playback. Thus, if parental controls have been applied to a particular STB, those controls will govern what programs can be recorded by a user through that STB and, hence, stored in the storage space associated therewith. It should also be stressed separate storage space may be allocated to each STB associated with a particular account (e.g., a household), and that restrictions and preferences associated with each STB may be applied only to recording and playback by that STB. For example, a single account may have parental controls applied to the STB associated with a child's television, while the STB in the parents' bedroom may have no restrictions.

Figure 2:
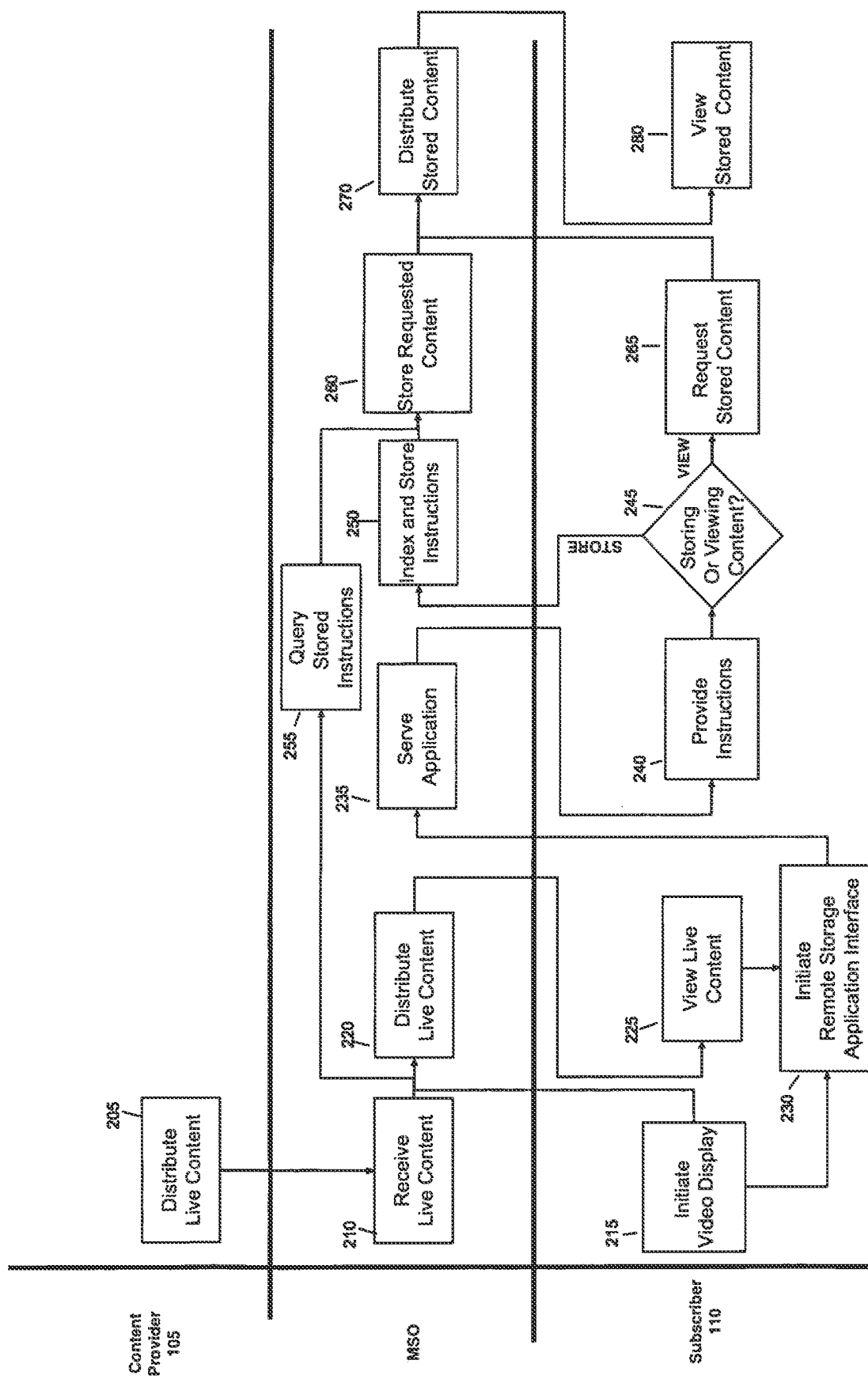
FIG. 2 is a flow chart illustrating the participants and steps involved in using the media content storage system of FIG. 1 according to an embodiment of the invention.

FIG. 2 illustrates an exemplary method for providing centrally-stored content to MSO subscribers. Live content (e.g., linear telecast television signals) is distributed (STEP 205) by content providers 105 to the MSO. Once received (STEP 210), the numerous content feeds are typically aggregated into one aggregated program stream and transported in Multi-Protocol Transport Services (MPTS) protocol format throughout the MSO environment and, using radio-frequency, ip-based protocols as well as other transmission techniques, on to the subscribers 110. In parallel, subscribers 110 initiate video displays (STEP 215) through the use of a STB or personal computer at their homes or businesses or using a wireless or satellite-enabled mobile device in order to view the live content. The MSO distributes the live content (STEP 220) as requested by the subscriber 110, who in turn views the live content (STEP 225). These steps describe, at a high level, the general distribution of cable television services as conventionally implemented.

Recently, however, MSOs have provided additional "interactive" features such as video-on-demand (VOD), DVR capabilities, and e-commerce applications along with the conventional transmission and redistribution servers. For example, if the subscriber 110 wishes to save certain content (either as it is being telecast or at some future date and time) he initiates a subscriber interface application (STEP 230). In some instances, the program commands and instructions that facilitate the execution of the subscriber interface application are provided on the STB, whereas in other cases the functionality is provided at the head-end, typically on one or more servers. In the example provided, the application resides at the MSO, and is served to the subscriber upon receipt of a command to do so (STEP 235), typically the selection of a button on a remote control or an icon presented on the television screen.

The subscriber may then provide instructions (STEP 240) via the STB (or other "client" as described above) by navigating an on-screen menu with a remote control (e.g., pressing the "record" button or scheduling the recording of a program in advance of its telecast). The STB automatically relays the instructions to the head-end over the network. In some instances, the subscriber 110 may want to record upcoming shows (or shows currently being telecast), whereas in other cases he may wish to view previously stored content (STEP 245). If the instructions are to record content, the application module 210 receives the instructions and, if multiple instructions to store the same content were received from more than one subscriber, aggregates and stores the instructions as a single command (STEP 250) for subsequent execution. When the content is telecast, the transaction server queries the stored commands (STEP 255) and provides the aggregated command to the primary and secondary content servers, which cause the content to be recorded (STEP 260) on the subscriber-specific storage devices (or device partitions allocated to subscribers).

If the subscriber wishes to view previously-stored content (i.e., he is not providing instructions to record and store additional content, but merely wants to access existing content from the storage device allocated to him), he may initiate a command to view the stored content via the application interface (STEP 265). In response, the transmission server recalls the stored content from the subscriber's dedicated storage device and distributes the content (STEP 270) accordingly. The subscriber may then view the content (STEP 280).

In some alternative embodiments, the subscriber may provide additional instructions via the application interface to alter the playback of the content using one or more "trick-modes" such as rewinding, fast-forwarding or pausing the content as it is played back. Conventionally, a complete copy of the content is stored on a local DVR, and trick-play telecasts merely require streaming the local copy from the hard drive of the DVR to the display device accordingly. However, providing remote storage capabilities (e.g., located at the head-end of a cable system) presents unique copyright compliance issues. Whereas the locally-stored copy residing on a subscriber's VCR or DVR has been deemed "fair use," a it has yet to be settled whether a copy stored at an MSO facility falls within this principle.

As a result, the invention facilitates trick-play functionality in a manner that minimizes the amount of content stored at the direction of the MSO and places most if not all control over the stored copies in the hands of the user. More specifically, content data packets are placed in a buffer only in response to user commands to implement trick play modes and at no time is this buffering done in the absence of such a customer command. Furthermore, only small portions of programming (e.g., fewer than 5 frames, less than 0.1 second of playback time, or less than 0.05% of the overall content for a ½ hour program) are buffered in order to provide this functionality. The data in the buffers may be deleted very shortly after being placed in the buffer (e.g., within one second) to avoid persistence of any data in the buffers. Operating in this manner, the invention enables the trick-play functions currently provided by local DVRs, but without requiring equipment at each subscriber location. Further, by significantly limiting (or in some cases eliminating) the control over the content exercised by the MSO and avoiding the creation of additional copies of the content, the technique respects copyright restrictions.

Figure 3:
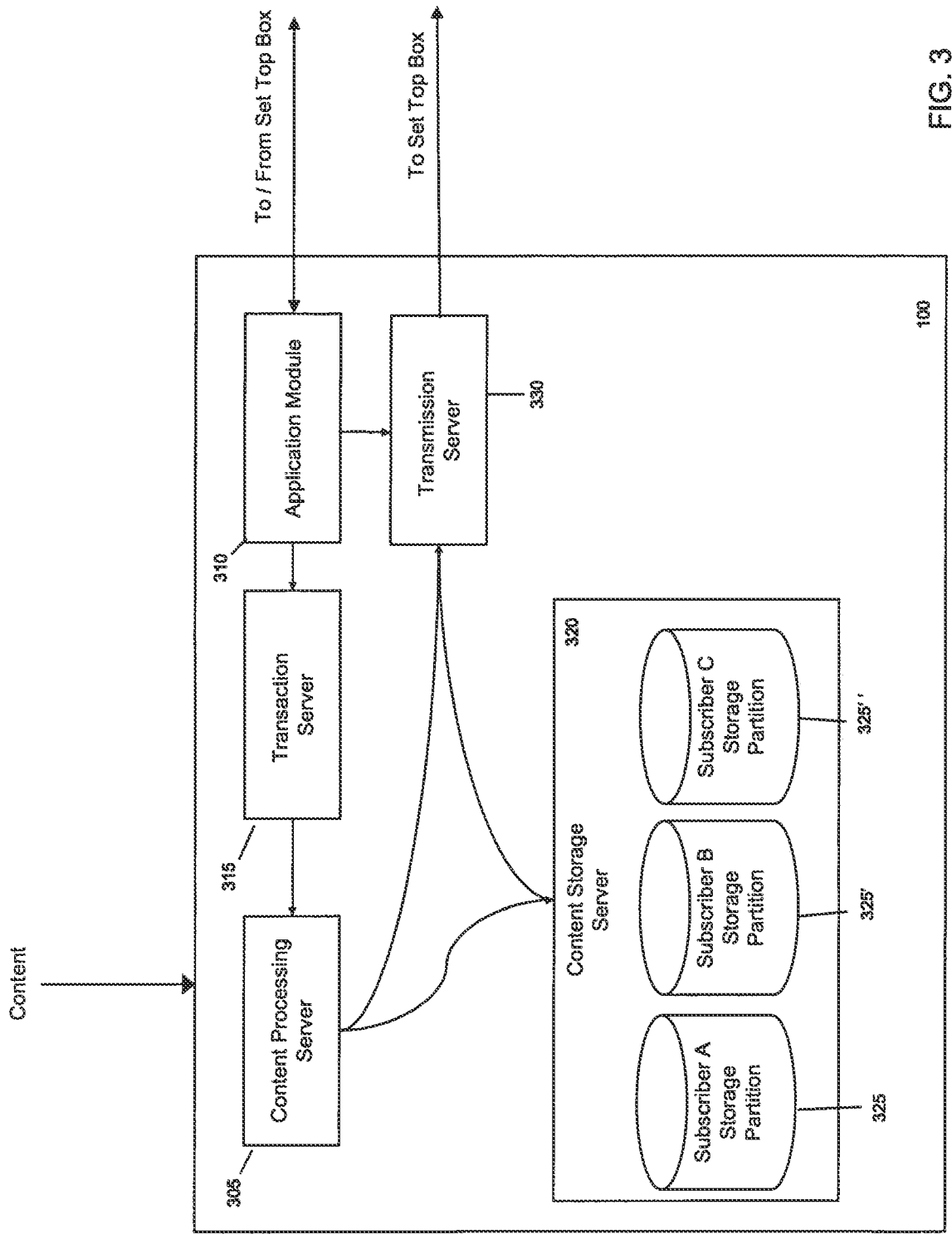
FIG. 3 is a more detailed block diagram of remote storage system of FIG. 1 according to an embodiment of the invention.

Referring now to FIG. 3, the content storage and distribution system 100 includes a content processing server 305 for ingesting content as received from content providers and for processing recording and playback commands, and an application module 310 for providing the application interface to and for receiving recording and playback instructions from the subscribers. A transaction server 315 creates the recording and playback commands as a result of the instructions received from the application module 310, and provides the commands to the content-processing server 305. The content-processing server 305 also provides multiple copies of the content to a content-storage server 320, which includes multiple content-storage areas (or, in some embodiments physical partitions) 320, 320' and 320", each allocated to individual subscribers (or to a collection of subscribers using a common STB, such as the members of a household).

The server components of the system interact with the STBs and other servers, and is preferably implemented on one or more server-class computers that have sufficient memory, data storage, and processing power and that run a server-class operating system (e.g. SUN Solaris, GNU/Linux, MICROSOFT WINDOWS NT). Other types of system hardware and software may also be used, depending on the capacity of the device and the number of users and the size of the user base. For example, the servers may be part of a server farm or server network, which is a logical group of one or more servers. As another example, there may be multiple servers that may be associated or connected with each other, or multiple servers may operate independently, but with shared data. In a further embodiment and as is typical in large-scale systems, application software may be implemented in components, with different components running on different server computers, on the same server, or some combination.

Together, these applications and subsystems provide four different logical functions: content delivery, processing of subscriber commands, content capture, and content transmission and playback, each of which is described in greater detail below.

Content Delivery

In order to make programming available for the system described herein, the aggregate programming stream containing all of the programming received from the content providers is split and one of the streams containing all of the linear network feeds is delivered to the content-processing server 305 for ingestion. The individual program streams contained in the aggregate programming stream may be transmitted in variable bit-rate format (VBR) whereas others may be transmitted in constant bit-rate format (CBR). In certain implementations, the content-processing server 305 only ingests program streams delivered in CBR (e.g., at a CBR of 3.75 MBits/sec, although the rate may change in other embodiments). In such cases, individual program streams transmitted using VBR are fed through a damper that converts the streams to CBR. In some embodiments, the damper includes a data buffer of limited size that facilitates storage of a very small amount of content as it is streamed into the content-processing server 305 and awaits commands from users to record the content. Other embodiments may enable ingestion of individual program streams in VBR, in which case the damper may not be necessary.

Processing Command Requests

The application module 310 manages the user's recording and playback instructions. The application module 310 (working in conjunction and through communication with publishing and control servers, not shown) verifies that (a) the STB is authorized to receive the programming in question, (b) the STB has not already requested that the programming in question be recorded, (c) there is available room on the dedicated storage space to store the allocated to the STB programming in question, and (d) in cases where simultaneous recording of multiple programming is not permitted, the recording will not result in the recording of more than two programs simultaneously. If the aforementioned criteria are not satisfied, an error message is relayed to the STB for display on a display device, directing the user to take remedial steps. In some instances, the application module 310 recognizes video-on-demand programming and will not process a command by a client to record it.

If the STB is verified, the application module 310 determines whether the particular program the user wants to record has been assigned an "asset ID," i.e., an alphanumeric code that uniquely identifies a particular program being telecast on a particular network at a particular time. If not, a program is assigned an asset ID the first time a user has commanded its recording on the system described herein. For example, if the same episode of "Grey's Anatomy" is telecast on Thursday night at 9PM and on Friday night at 8PM, each telecast is assigned a separate asset ID and is treated by the present system as a separate asset, even though the Friday telecast is a re-run. Moreover, if a user records only a portion of a program—for example if the user presses record one minute after a particular episode of "Desperate Housewives" has begun—that recording, because it is a unique recording of something less than the entire episode, is assigned a separate asset ID.

If it is the first time a user has commanded the recording of this particular program, the application module 310 communicates the instructions to the transaction server 315 via an application interface and the transaction server 315 creates an asset ID for the program, using scheduling information sent from a media service bureau and channel and time information regarding the program to be recorded. The asset ID is stored in the transaction server 315, and may be re-used if other users subsequently request recording of the same program. The transaction server 315 may then aggregate the common instructions (e.g., all instructions to record the same program) into a single command, which is processed by the content-processing server 305 in a manner that identifies each of the particular STBs through which the command was issued and the program to be recorded.

In some embodiments, the transaction server 315 also communicates a household identifier that identifies the household to which the particular STB belongs in order to enable certain functionality. For example, the household ID may be used to ensure that all STBs in the household can access the recording. The transaction server 315 aggregates all the recording commands for a particular program and, when the time of the program's telecast arrives, the transaction server 315 sends one message to the content-processing server 305 indicating which and how many users have commanded its recording.

In general, the application module 310 only processes the initial command to record a specific program. For subsequent record requests for the same program, the transaction server 315 formulates (or reformulates) the message concerning this subsequent record command to the content-processing server 305 to include additional information relating to the additional user-initiated commands. In some embodiments, no programming is recorded unless a subscriber issues a specific command to record the programming, and no programming is stored on a hard drive in the secondary content server 320 unless it has been recorded by a subscriber.

In some embodiments, multiple copies of the functional programming instructions that make up the application module 315 may be allocated to individual STBs, users, or combinations thereof. In such cases, the copies may persist regardless of whether the user is providing recording or playback commands, or, in alternative embodiments, an instance of the application may be crated in response to receiving an initial command from the user. Application agents (e.g., software components) may be placed throughout the network to intercept and/or identify user-initiated commands and perform some or all of the functions of the application module 315, or in some cases, direct the application module 315 to copy some or all of the functional components into a user-specific memory space. For example, the user-specific application code may, in some cases, reside on the same physical storage device (and in some cases the same partition) as the user's dedicated storage, whereas in other cases it may reside elsewhere. In either case, creating user-specific instances of the application code provides additional evidence that any copies are being made at the explicit instruction of the user, and not in response to commands created by the MSO.

Content Capture

The content-processing server 305 responds to the messages received from the transaction server 315 and creates a duplicate content stream for each user having commanded the recording of the program. The content-processing server 305 determines the content-storage server 320 (if more than one) and the content storage area 325 (if specifically identified) to which each content stream is to be allocated. The content-storage server 320 then copies program onto the dedicated storage space(s) 325 of each user who has commanded its recording. Once the recording is completed, the content-processing server 305 sends a message to the transaction server 315 that the recording has been made. In the event of an error in the recording process, an error message is relayed to the transaction server 315 and in some cases to the application module 310 for transmission to the user. If the capture was successful, the transaction server 315 thereupon communicates an "ingestion completed" message to the application module 310, which communicates it to the client. The recorded program is then included on the client's recording programming list, which is accessible through the user-interface menu system.

In one implementation, each secondary server 320 contains (or has direct write access to) a series of 400-gigabyte hard drives. Each authorized user (or STB) is assigned up to a maximum storage allotment (e.g., 160 gigabytes of storage space) on one hard drive. In some instances, each hard drive is virtually partitioned into user-specific partitions. In some implementations, no user is allocated storage space on more than one hard drive, and multiple (e.g., up to four) users may share space on one hard drive. Every recording made through a particular STB is stored in the storage space assigned to that STB (or the user associated with the STB), and only that user can access the recordings stored in its allocated storage space.

In deference to copyright restrictions that limit the method of copying programming, multiple users issuing a record command for the same program generate separate copies of the program for each user who issued the record command, with each copy located in each user's storage space. For example, if 1000 users elect to record the February 25th 9PM showing of "Desperate Housewives," 1000 real-time copies of that specific showing are written to 1000 separate storage spaces. In this implementation, no redundant or back-up copies of programs recorded by users are made. Consequently, if the system malfunctions or if the disk drive on which the client's dedicated storage space is located is damaged, the user loses the affected content.

When the recording-completion message is delivered to the transaction server 315, the application module 310 is notified as well. In response, the application module 310 moves the asset to a "PRODUCTION" state indicating its availability as a recordable asset. As part of being set to the "PRODUCTION" state, the asset metadata is saved (in, for example an LDAP directory server, not shown) for access by a transmission server 330 during playback. The LDAP directory server is used to quickly access information about production assets in order to identify the relevant content storage server 320 and the particular hard drive on which they reside. In addition, the asset data provided by the LDAP interface may include encryption access criteria that are typically not available at the STB.

Playback

Once the recording has been captured by the system 110 and notification of the transaction server 315 and application module 310 has completed, the asset is available for playback by the STB through which it was recorded.

The application module 310 provides a menu screen that enables a user to access a list of programs that have been recorded by that STB. Each program represents a uniquely captured asset stored on the content storage server 320 dedicated to that STB. The user begins playback by pressing "play" on the remote control. In order to stream the asset, the STB establishes a session with the transmission server 330 on behalf of the client. The transmission server 330 includes an enterprise session resource manager module (eSRM, not shown) that manages individual connections and system resources as dedicated to individual STB s.

In general, the STB connects to the eSRM via internet protocol. The eSRM establishes a session by first forwarding the playback command to the transaction server 315, and then forwarding the playback command message to the storage device selected by the transaction server 315. The transaction server 315 first determines if the asset exists. Then, based on the service group of the client, the content processing server 305 identifies the content storage server 320 and specific storage partition 325 on which the asset is located as well as any encryption information needed for the asset (if needed), and communicates this information to the eSRM. The eSRM then informs the content processing server 305 of the asset to be streamed, and the content processing server 305 responds with a request for bandwidth required to stream the asset. The eSRM communicates with a quadrature amplitude modulation (QAM) device to reserve the bandwidth necessary for the streaming of the asset. Once it has all the information necessary to establish the streaming session, the eSRM informs the appropriate content storage server 320 of the resources required to stream this asset. The resource information comprises or consists of the QAM IP address, user datagram protocol (UDM) port number of the QAM and, optionally, an MPEG program number to put in the stream. The eSRM additionally completes the session with the STB, informing the STB of the frequency and program number needed to "tune" to the stream. The asset is then streamed to the STB for viewing on a display device.

Figure 4:
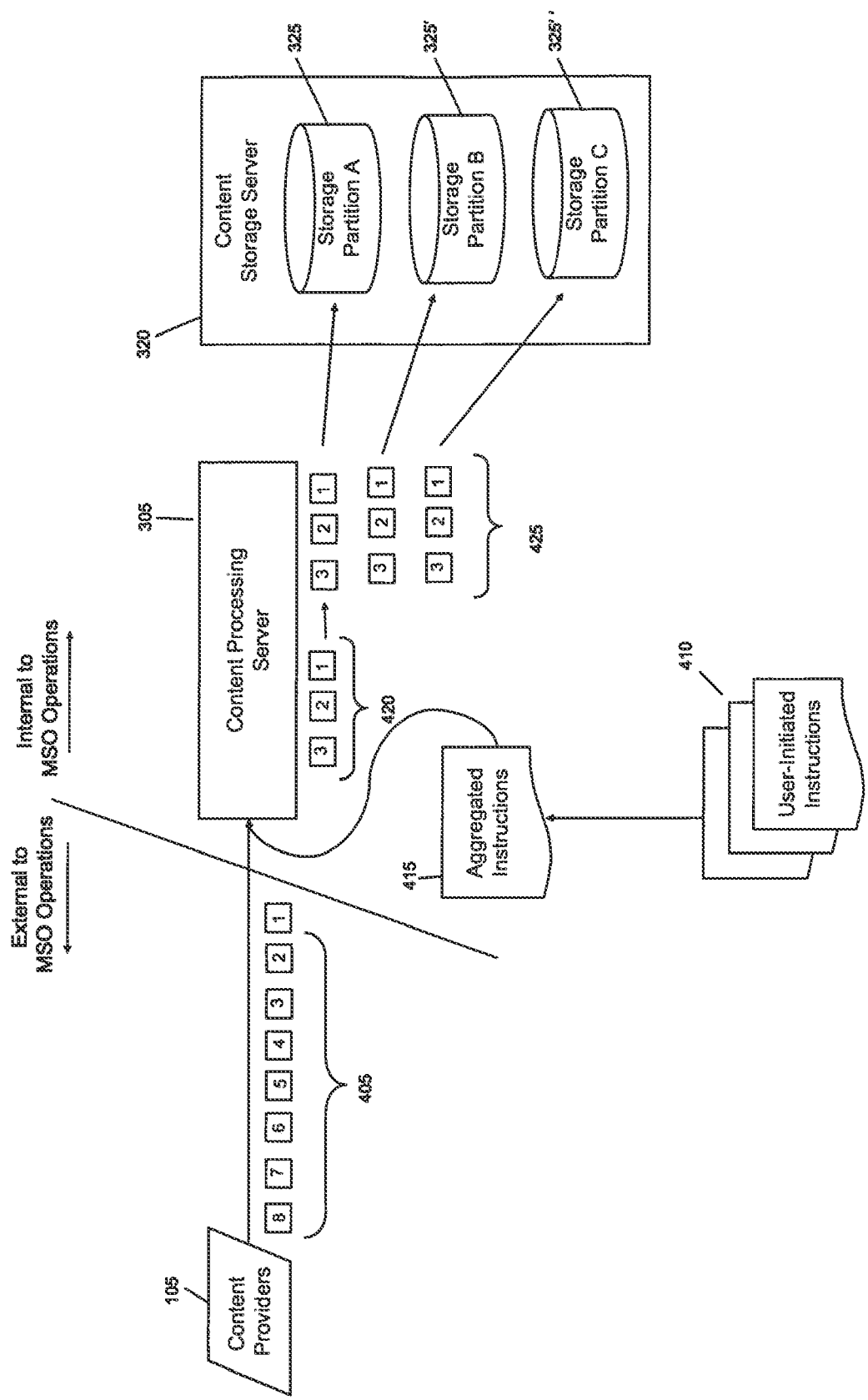
FIG. 4 is a block diagram depicting the receipt and storage of content according to an embodiment of the invention.

FIG. 4 provides a more detailed illustration of the content capture and storage process described above. Content streams 405 are provided from content providers 105 and are ingested by a content storage server 305 within the MSO environment. The streams 405 may be "packet-based" such that individual packets (e.g., packets 1-8) of information can be identified and stored independently of each other and re-assembled into content. User initiated commands 410 are captured and, in this example, aggregated into a single command 415.

For example, if three users indicated that they wanted to record a particular sporting event, three user initiated commands 410 are created—one for each user. Subsequently, these three commands can be combined into one command that includes the identification (e.g., IP address, MAC address, subscriber ID, etc.) of each user issuing such commands and the unique asset ID associated with the content. The aggregated commands 415 are provided to the primary content server which stores a de minimis portion of the stream 405 in a primary buffer 420. Based on the commands, the content-storage server 305 determines the number of secondary buffers 425, 425' and 425" needed to fulfill the users' recording commands, and makes a copy of the portion of the stream for each buffer 425. Each copy is delivered to the content-storage server 320 and stored in the storage area(s) 325 allocated to the user(s) issuing the commands to do so.

In some implementations, the size of the primary buffer and/or the secondary buffer is limited to avoid creating any significant and/or fixed copies of the content prior to being stored on the user-specific 325. In such cases, the number of packets that can be stored at any one time in the buffers may be limited so as to represent a de minimis portion of the overall content. For example, if it is determined that storing no more than 0.05% of any one program is acceptable from a copyright perspective, the upper bound on the number of packets stored at any one time can be limited to a number representing less than one second of a thirty minute program (30 minutes×60 seconds/minute×0.05%=0.9 second.) The buffer sizes may remain constant, or in some cases may change with the duration of the program being copied. In some instances, the buffer size may be determined based on a fixed number of frames (e.g., 3).

Figure 5:
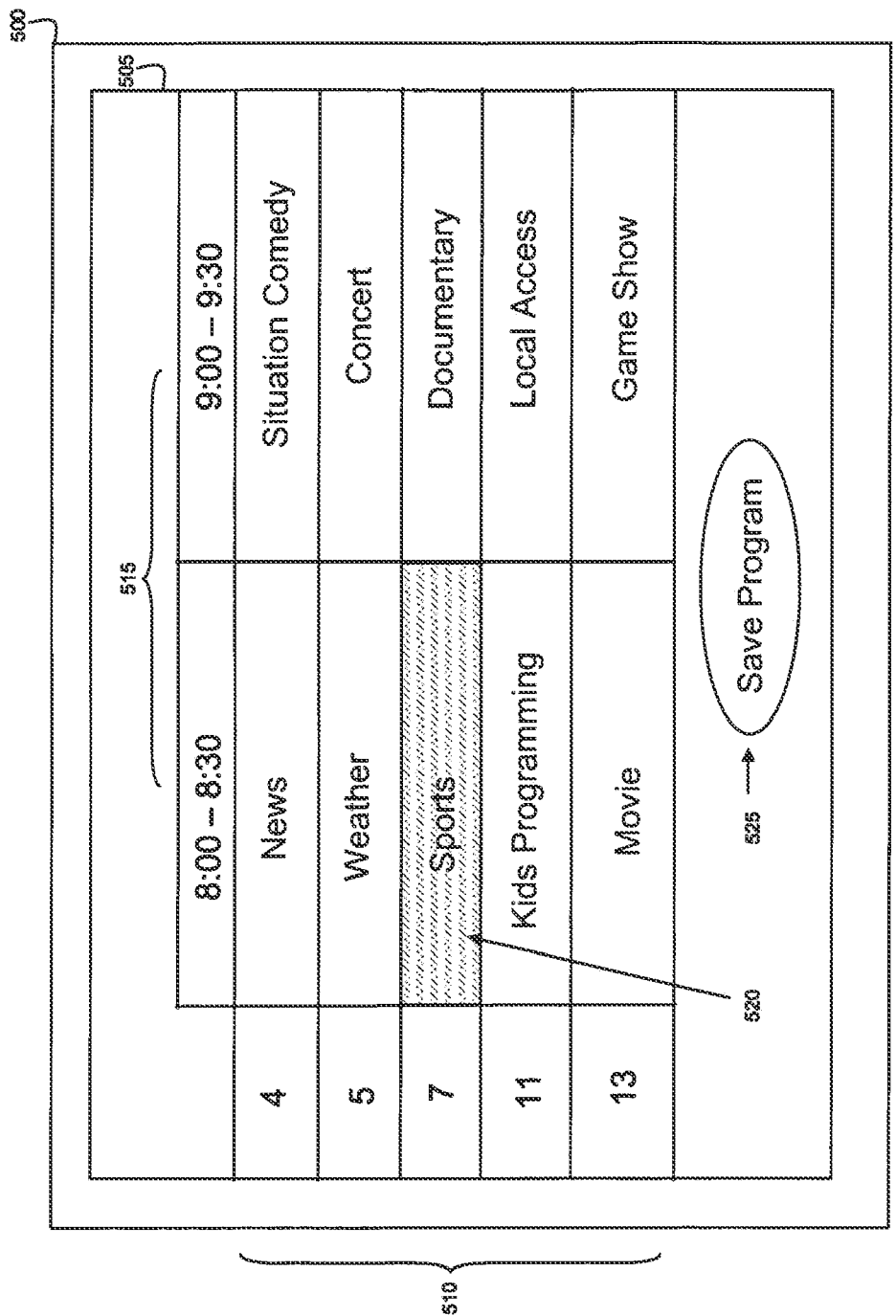
FIG. 5 is an exemplary content guide screen with which users select content to be stored in an embodiment of the invention.
Figure 6:
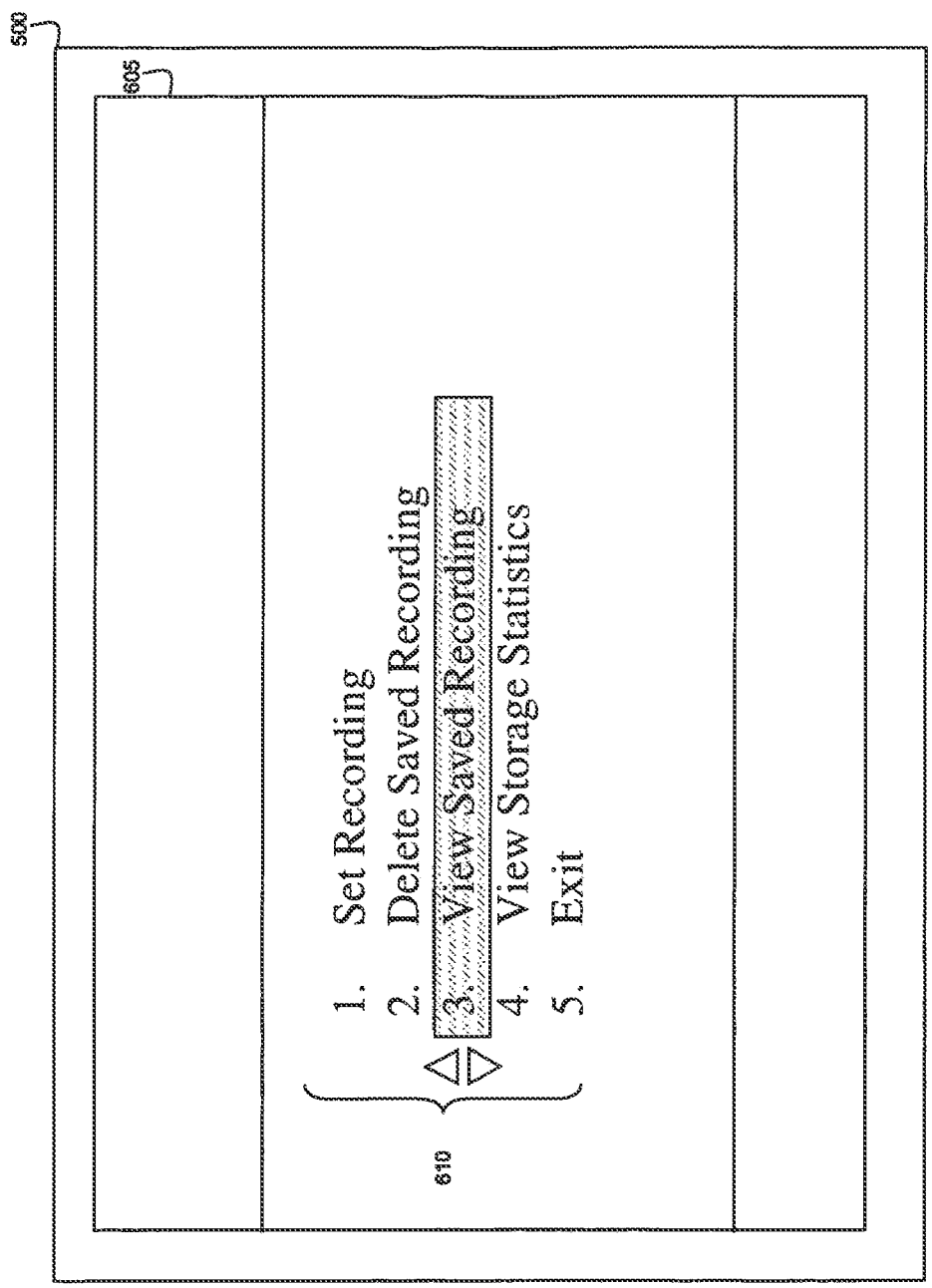
FIG. 6 is an exemplary menu screen with which users select content to be stored, viewed and deleted in an embodiment of the invention.

FIGS. 4 and 5 illustrate example screen captures of a menu-based application that facilitates the display of information and capturing of user commands as described above. A display device 500 (typically a television, but in other instances a computer monitor, PDA screen, WAP-enabled telephone or other mobile device) displays interactive screens that respond to commands entered using a remote control, pointing device (e.g., mouse or stylus), human touch, voice or other means of entering commands. Referring specifically to FIG. 5, a channel line-up screen 505 provides the user with a channel 510 and time-based 515 grid of programs 520 available for recording. The user manipulates the screen to indicate which show he wishes to record, and selects a button or icon 525 which sends the appropriate commands to the head-end servers for processing. FIG. 6 provides an exemplary screen 605 from a menu-based application that enables the user to select various commands 610 for manipulating content, including saving, viewing and deleting content, as well as monitoring storage statistics (e.g., amount of physical space remaining) for her dedicated storage.

In summary, the invention goes beyond conventional methods for storing content on behalf of users by limiting, at each step of the process, the portion of the content stored by the operator, and places the responsibility for managing the stored content squarely on the shoulders of the user. In carrying out the invention, the limited buffering enhancement to a dedicated content storage service enables the user perform operations on telecast programming previously only permitted using personal DVR devices at the user's location. Thus, using the techniques and systems described herein, MSOs can offer DVR-like functionality without needing to provide and maintain thousands of DVR devices while still respecting copyright principles.

What is claimed is:

1. A content storage and distribution system for storing a program, the content storage and distribution system comprising:
a content storage area having a plurality of dedicated storage spaces, a first dedicated storage space and a second dedicated storage space from among the plurality of dedicated storage spaces being allocated exclusively to a first user and a second user, respectively, from among a plurality of users and being under exclusive control of the first user and the second user, respectively;
a content processing server configured to:
store at most a copyright compliant portion of the program, wherein the copyright compliant portion of the program comprises a de minimis portion of the program,
create a first copy of the copyright compliant portion of the program and a second copy of the copyright compliant portion of the program, the first copy of the copyright compliant portion of the program and the second copy of the copyright compliant portion of the program being uniquely associated with the first user and the second user, respectively, and
delete the at most copyright compliant portion of the program after the first copy of the copyright compliant portion of the program and the second copy of the copyright compliant portion of the program have been recorded to a first copy of the program stored in the first dedicated storage space and to a second copy of the program stored in the second dedicated storage space, respectively; and
a content storage server configured to record the first copy of the copyright compliant portion of the program and the second copy of the copyright compliant portion of the program to the first copy of the program stored in the first dedicated storage space and the second copy of the program stored in the second dedicated storage space, respectively, the first copy of the program stored in the first dedicated storage space and the second copy of the program stored in the second dedicated storage space being under exclusive control of the first user and the second user, respectively,
wherein the content processing server and the content storage server are further configured to iteratively store the at most copyright compliant portion of the program, create the first copy of the copyright compliant portion of the program and the second copy of the copyright compliant portion of the program, delete the at most copyright compliant portion of the program, and record the first copy of the copyright compliant portion of the program to the first copy of the program stored in the first dedicated storage space and the second copy of the copyright compliant portion of the program stored in the second dedicated storage space, and
wherein for each iteration, the content processing server is further configured to store at most another copyright compliant portion of the program.

2. The content storage and distribution system of claim 1, wherein the de minimis portion of the program comprises no more than 0.05% of the program.

3. The content storage and distribution system of claim 1, wherein
the content processing server is configured to create the first copy of the copyright compliant portion of the program only in response to a first command from the first user to record the program and the second copy of the copyright compliant portion of the program only in response to a second command from the second user to record the program.

4. The content storage and distribution system of claim 1, wherein the content processing server is further configured to:
aggregate a first command from the first user to record the program and a second command from the second user to record the program into a single command to record the program, the single command including a first identification of the first user, a second identification of the second user, and an asset identifier that uniquely identifies the program; and
create the first copy of the copyright compliant portion of the program and the second copy of the copyright compliant portion of the program in response to the single command.

5. The content storage and distribution system of claim 1, wherein the content processing server comprises:
- a primary buffer configured to store the at most copyright compliant portion of the program; and
- a first secondary buffer and a second secondary buffer configured to store the first copy of the copyright compliant portion of the program and the second copy of the copyright compliant portion of the program, respectively,
- wherein the content processing server is configured to delete the at most copyright compliant portion of the program from the primary buffer as the first copy of the copyright compliant portion of the program and the second copy of the copyright compliant portion of the program are being stored in the first secondary buffer and the second secondary buffer, respectively, such that no more than the at most copyright compliant portion of the program is stored in the primary buffer.

6. The content storage and distribution system of claim 1, further comprising:
- an application module configured to:
  - create an asset identifier that uniquely identifies the program in response to a first command from the first user to record the program; and
  - re-use the asset identifier in response to a second command from the second user to record the program,
- wherein the content processing server is configured to store the at most copyright compliant portion of the program that is associated with the asset identifier.

7. The content storage and distribution system of claim 1, wherein for each iteration, the content processing server is further configured to store the at most another copyright compliant portion of the program until a first complete copy of the program and a second complete copy of the program are stored in the first dedicated storage space and the second dedicated storage space, respectively.

8. A method for storing a program in a content storage and distribution system, the method comprising:
- performing, by the content storage and distribution system, an iterative process to store the program, the iterative process comprising:
  - storing, by a content processing server within the content storage and distribution system, at most a copyright compliant portion of the program, wherein the copyright compliant portion of the program comprises a de minimis portion of the program;
  - creating, by the content processing server, a first copy of the copyright compliant portion of the program and a second copy of the copyright compliant portion of the program, the first copy of the copyright compliant portion of the program and the second copy of the copyright compliant portion of the program being uniquely associated with a first user and a second user, respectively;
  - deleting, by the content processing server, the at most copyright compliant portion of the program after the first copy of the copyright compliant portion of the program and the second copy of the copyright compliant portion of the program have been recorded to a first copy of the program stored in a first dedicated storage space that is allocated exclusively to the first user and to a second copy of the program stored in a second dedicated storage space that is allocated exclusively to the second user, respectively; and
  - recording by a content storage server within the content storage and distribution system, the first copy of the copyright compliant portion of the program to the first copy of the program stored in the first dedicated storage space and the second copy of the copyright compliant portion of the program to the second copy of the program stored in the second dedicated storage space, the first copy of the program stored in the first dedicated storage space and the second copy of the program stored in the second dedicated storage space being under exclusive control of the first user and the second user, respectively,
- wherein for each iteration of the iterative process, the storing stores at most another copyright compliant portion of the program.

9. The method of claim 8, wherein the de minimis portion of the program comprises no more than 0.05% of the program.

10. The method of claim 8, wherein the creating comprises:
- creating the first copy of the copyright compliant portion of the program only in response to a first command from the first user to record the program; and
- creating the second copy of the copyright compliant portion of the program only in response to a second command from the second user to record the program.

11. The method of claim 8, wherein the creating comprises:
- aggregating a first command from the first user to record the program and a second command from the second user to record the program into a single command to record the program, the single command including a first identification of the first user, a second identification of the second user, and an asset identifier that uniquely identifies the program; and
- creating the first copy of the copyright compliant portion of the program and the second copy of the copyright compliant portion of the program in response to the single command.

12. The method of claim 8, wherein the storing comprises:
storing the at most copyright compliant portion of the program into a primary buffer, wherein the creating comprises:
- storing the first copy of the copyright compliant portion of the program and the second copy of the copyright compliant portion of the program into a first secondary buffer and a second secondary buffer, respectively, and
wherein the deleting comprises:
- deleting the at most copyright compliant portion of the program from the primary buffer as the first copy of the copyright compliant portion of the program and the second copy of the copyright compliant portion of the program are being stored in the first secondary buffer and the second secondary buffer, respectively, such that no more than the at most copyright compliant portion of the program is stored in the primary buffer.

13. The method of claim 8, further comprising:
creating an asset identifier that uniquely identifies the program in response to a first command from the first user to record the program; and
re-using the asset identifier in response to a second command from the second user to record the program,
wherein the storing comprises:
- storing the at most copyright compliant portion of the program that is associated with the asset identifier.

14. The method of claim 8, wherein for each iteration of the iterative process, the storing stores the at most another copyright compliant portion of the program until a first complete copy of the program and a second complete copy of the program are stored in the first dedicated storage space and the second dedicated storage space, respectively.

15. A content storage and distribution system for storing a program, the content storage and distribution system comprising:
a memory configured to store instructions; and
one or more processors configured to execute the instructions, the instructions, when executed by the one or more processors, configuring the one or more processors to:
store at most a copyright compliant portion of the program, wherein the copyright compliant portion of the program comprises a de minimis portion of the program,
create a first copy of the copyright compliant portion of the program and a second copy of the copyright compliant portion of the program, the first copy of the copyright compliant portion of the program and the second copy of the copyright compliant portion of the program being uniquely associated with a first user and a second user, respectively,
delete the at most copyright compliant portion of the program after the first copy of the copyright compliant portion of the program and the second copy of the copyright compliant portion of the program have been recorded to a first copy of the program stored in a first dedicated storage space that is allocated exclusively to the first user and to a second copy of the program stored in a second dedicated storage space that is allocated exclusively to the first user, respectively, and
record the first copy of the copyright compliant portion of the program to the first copy of the program stored in the first dedicated storage space and the second copy of the copyright compliant portion of the program to the second copy of the program stored in the second dedicated storage space, the first copy of the program stored in the first dedicated storage space and the second copy of the program stored in the second dedicated storage space being under exclusive control of the first user and the second user, respectively,
wherein the instructions, when executed by the one or more processors, further configure the one or more processors to iteratively store the at most copyright compliant portion of the program, create the first copy of the copyright compliant portion of the program and the second copy of the copyright compliant portion of the program, delete the at most copyright compliant portion of the program, and record the first copy of the copyright compliant portion of the program to the first copy of the program stored in the first dedicated storage space and the second copy of the copyright compliant portion of the program to the second copy of the program stored in the second dedicated storage space, and
wherein for each iteration, the instructions, when executed by the one or more processors, further configure the one or more processors to store at most another copyright compliant portion of the program.

16. The content storage and distribution system of claim 15,
wherein the instructions, when executed by the one or more processors, configure the one or more processors to create the first copy of the copyright compliant portion of the program only in response to a first command from the first user to record the program and the second copy of the copyright compliant portion of the program only in response to a second command from the second user to record the program.

17. The content storage and distribution system of claim 15, wherein the instructions, when executed by the one or more processors, further configure the one or more processors to:
aggregate a first command from the first user to record the program and a second command from the second user to record the program into a single command to record the program, the single command including a first identification of the first user, a second identification of the second user, and an asset identifier that uniquely identifies the program; and
create the first copy of the copyright compliant portion of the program and the second copy of the copyright compliant portion of the program in response to the single command.

18. The content storage and distribution system of claim 15, wherein the instructions, when executed by the one or more processors, configure the one or more processors to:
store the at most copyright compliant portion of the program into a primary buffer;
store the first copy of the copyright compliant portion of the program and the second copy of the copyright compliant portion of the program into a first secondary buffer and a second secondary buffer, respectively; and
delete the at most copyright compliant portion of the program from the primary buffer as the first copy of the copyright compliant portion of the program and the second copy of the copyright compliant portion of the program are being stored in the first secondary buffer and the second secondary buffer, respectively, such that no more than the at most copyright compliant portion of the program is stored in the primary buffer.

19. The content storage and distribution system of claim 15, wherein the instructions, when executed by the one or more processors, further configure the one or more processors to:
create an asset identifier that uniquely identifies the program in response to a first command from the first user to record the program;
re-use the asset identifier in response to a second command from the second user to record the program; and
store the at most copyright compliant portion of the program that is associated with the asset identifier.

20. The content storage and distribution system of claim 15, wherein for each iteration, the instructions, when executed by the one or more processors, further configure the one or more processors to store the at most another copyright compliant portion of the program until a first complete copy of the program and a second complete copy of the program are stored in the first dedicated storage space and the second dedicated storage space, respectively.

* * * * *

UNITED STATES PATENT AND TRADEMARK OFFICE
CERTIFICATE OF CORRECTION

| | |
|---|---|
| PATENT NO. | : 11,979,628 B1 |
| APPLICATION NO. | : 17/373072 |
| DATED | : May 7, 2024 |
| INVENTOR(S) | : Neill et al. |

It is certified that error appears in the above-identified patent and that said Letters Patent is hereby corrected as shown below:

On the Title Page

Item (72), in "Inventors", Line 3, delete "CT" and insert -- NY --, therefor.

In the Claims

In Column 14, Claim 3, Lines 47-53, delete "the content processing server is configured to create the first copy of the copyright compliant portion of the program only in response to a first command from the first user to record the program and the second copy of the copyright compliant portion of the program only in response to a second command from the second user to record the program." and insert the same at Line 46, after "wherein", as a continuation point.

In Column 18, Claim 16, Lines 3-10, delete "wherein the instructions, when executed by the one or more processors, configure the one or more processors to create the first copy of the copyright compliant portion of the program only in response to a first command from the first user to record the program and the second copy of the copyright compliant portion of the program only in response to a second command from the second user to record the program." and insert the same at Line 2, after "15," as a continuation point.

Signed and Sealed this
Eleventh Day of June, 2024

Katherine Kelly Vidal
*Director of the United States Patent and Trademark Office*